United States Patent

Perrotta

[11] Patent Number: 5,553,816
[45] Date of Patent: Sep. 10, 1996

[54] SATELLITE TELECOMMUNICATIONS AND REMOTE SENSING SYSTEM BASED ON THE USE OF SHORT-PERIOD SUN-SYNCHRONOUS ELLIPTICAL ORBITS

[75] Inventor: Giorgio Perrotta, Rome, Italy

[73] Assignee: Alenia Spazio SpA, L'Aquila, Italy

[21] Appl. No.: 312,297

[22] Filed: Sep. 26, 1994

[30] Foreign Application Priority Data

Sep. 24, 1993 [IT] Italy ................... RM93A0643

[51] Int. Cl.$^6$ ............... B64G 1/24; H04B 7/185
[52] U.S. Cl. ............. 244/158 R; 379/60; 455/12.1; 455/13.2; 342/352
[58] Field of Search .............. 244/158 R; 379/59, 379/60; 455/12.1, 13.1, 13.2, 13.3; 392/352, 354, 355, 356, 357

[56] References Cited

U.S. PATENT DOCUMENTS

| | | | |
|---|---|---|---|
| 3,706,037 | 12/1972 | Lundgren, Jr. ................. | 455/13.1 |
| 3,836,969 | 9/1974 | Bond et al. ................... | 455/13.1 |
| 4,502,051 | 2/1985 | Dondl ......................... | 455/12.1 |
| 4,809,935 | 3/1989 | Draim ......................... | 244/158 R |
| 4,827,421 | 5/1989 | Dondl ......................... | 342/356 |
| 4,854,527 | 8/1989 | Draim ......................... | 244/158 R |
| 4,943,808 | 7/1990 | Dulck et al. .................. | 342/356 |
| 5,433,726 | 7/1995 | Horstein ....................... | 455/12.1 |

OTHER PUBLICATIONS

Royal Aircraft Establishment, Technical Report 82116, Walker Dec. 1982, "Coverage Predictions & Selection Criteria for Satellite Constell".
Royal Aircraft Establishment, technical Report 77044, Walker Sep. 1977 "Continuous whole Earth Coverage by Circular–Orb. & Satellite Patterns".
Draim "Satellite Constellations For Optimal Northern Hemisphere Coverage" Oct. 4–7–1983.

Primary Examiner—Andres Kashnikow
Assistant Examiner—Virna Lissi Mojica
Attorney, Agent, or Firm—Cohen, Pontani, Lieberman, Pavane

[57] ABSTRACT

A satellite telecommunications and remote sensing system including a plurality of satellites arranged above the Earth in short-period elliptical sun-synchronous orbits which have the following Keplerian parameters: an orbit inclination of 116.6° on an equatorial plane of the Earth, a daily rotation of a nodal line of 0.9863°, an orbital period selected such that N orbital periods fit into M sidereal days, any desired argument of perigee and any desired value of the right ascension of the ascending node.

14 Claims, 8 Drawing Sheets

SATELLITE TELECOMMUNICATIONS AND REMOTE SENSING SYSTEM BASED ON THE USE OF SHORT-PERIOD SUN-SYNCHRONOUS ELLIPTICAL ORBITS

BACKGROUND OF THE INVENTION

1. Field of the Invention

The present invention relates to a satellite telecommunications and remote sensing system, based on the use of a number of satellites placed in elliptical sun-synchronous orbits, inclined with respect to the equatorial plane, and having an orbital period of approximately three hours.

The system according to the invention may be used advantageously for telecommunication via satellite when it is necessary to settle simplex or duplex radio communication within a country or geographical areas which are homogeneous as regards language, culture, ethnicity or socio-economic interests, or between countries situated in non-contiguous geographical areas. The telecommunications services, for which the invention provides significant economical advantages, include, among other things: personal communications; communication through mobile ground, sea and air means; remote radio-location of the position of the mobile means, and radio navigation; personal selective remote indication; simplex or duplex data transmission between small fixed or portable terminals; direct radio broadcasting of radio or TV programs; teleconferences; emergency communications; and data dissemination and collection.

The invention is also applicable to regional remote sensing, in particular in the field of meteorology and Earth observation using optical sensors.

On the basis of the invention, the sun-synchronization features of the satellite orbit and the position of the orbital plane (essentially according to the normal to the solar rays), in comparison with other satellite systems used for the same applications, make it possible to simplify the satellite configuration, especially as regards: power generation on the part of the solar generation; storage of electrical power through rechargeable batteries; and thermal conditioning of the satellite.

The inclination of the orbital plane with respect to the equator is equivalent to 116.4° in order to annul the rotation of the line of apsides. The eccentricity of the orbit and the orbital period, which results from the choice of a sun-synchronous orbit with an inclination of 116.4°, together with the value of the inclination and an orientation of the position of the orbital plane such as to result almost transversal to the direction of the solar rays, provide the following positive effects:

the satellite is visible for sufficiently long periods of time at the apogees, and on average around 12:00 hours or 24:00 hours, local time; and the satellite is visible from ground stations located at latitudes greater than approximately 20° North or smaller than approximately 20° South, with sufficiently large angles of elevation with respect to the horizon and such as to allow radio links which are less dependent on atmospheric precipitations and on blocking phenomena caused by natural or artificial obstacles.

2. Description of the Prior Art

The currently available satellite telecommunication and remote sensing systems have so far exploited stationary orbits as well as different types of non-stationary orbits. Among the latter, the most worthy of mention are:

low circular orbits (LEO=Low Earth Orbits), with orbital altitudes usually in the range of 500 to 1,500 Km (for remote sensing purposes, the orbital altitude is usually below 1,000 Km);

slightly elliptical orbits with a very short period, i.e. usually less than 2 hours, with an eccentricity ranging from 0.05 to 0.15;

medium-period circular orbits, with altitudes above 10,000 Km; and elliptical orbits inclined by 63.4° with respect to the equatorial plane, with 24-hour (Tundra orbit), 12-hour (Molniya orbit) or 8-hour periods.

The stationary orbits used in the past, and still proposed today in creating innovative telecommunication systems, were not based on the use of sun-synchronous orbits or on the use of eccentricity values such as to obtain orbital periods lasting approximately 3 hours.

In particular:

Low circular or slightly elliptical short-period orbits have been used for constellations with a large number of satellites (from 12 to 80) for the coverage of the entire globe. The services rendered include telephony, personal communications and communications through mobile devices. The main inconveniences regarding these constellations reside in the large number of satellites, inversely proportional to the orbital altitude; and the reduced visibility—approximately 10 minutes—of each satellite on the part of the ground user. In remote sensing applications, the short fly times over the area to be surveyed made it practically impossible to carry out observation missions which, on the contrary, require long observation times of the same geographical area from the satellite. The only practical possibility, for these missions, was represented by the use of stationary orbit satellites. However, in this case, the great distance of the satellite from Earth involved the creation of large-sized optical systems in order to obtain satisfactory performance in terms of geometric and radiometric resolution. Circular medium-period orbits require a smaller number of satellites for the continuous coverage of the globe when compared to low orbits; however, this advantage is offset by the fact that these orbits have a greater energy requirement than the lower orbits. For this reason, injecting satellites into their target orbits is more expensive than injecting them into low or slightly elliptical orbits. Coverage requirements also require that these orbits have orbital plane inclinations with respect to the equator ranging from 40° to 60° and are therefore characterized by a rotation of the nodal line such that the position of the orbital plane with respect to the direction of the solar rays changes continuously during the year. This implies a continuous variation of the electrical power coming from the on-board solar plant, and this fact is made even more critical by the occurrence of blackout periods when the satellite enters into the shadow cone of the Earth. There is also a continuous change in the environmental thermal conditions experienced by the satellite during its operational life. All of these factors imply a higher weight and a greater complexity for the satellite, as well as an increase in its design and production costs. Long-period elliptical incline orbits are used in telecommunications satellite systems for the coverage of single continents or for well-defined geographical areas. These orbits have a 63.4° inclination of the orbital plane, since with this value of inclination the rotation of the line of apsides is annulled, and therefore the orbit apogee and perigee always correspond to the same terrestrial latitudes. The orbital period is chosen equal to the sidereal day (Tundra orbit) or to a submultiple of the sidereal day (Molniya orbit and 8-hour orbit), so that the satellite motion is synchronous or subsynchronous with the rotation of the Earth. While this ensures the periodical presentation of the satellite over the same geographical areas, it also involves a rotation of the nodal line which makes the position of the orbital plane vary in time with respect to the direction of the solar rays, thus causing the same inconveniences as those mentioned for medium-period circular orbits.

SUMMARY OF THE INVENTION

As a result of the technical status described above, there arises the need to create satellite constellations based on new types of orbits capable of maintaining several of the favorable characteristics of the orbits mentioned above while eliminating their negative aspects. In particular, there is a great interest for those orbits which have the following characteristics:

medium-high orbital altitudes, at least for most of the orbital period, so as to considerably increase the duration of the satellite visibility windows from the ground stations, and the duration of observability of the same geographical area from the satellite;

an orbital period intermediate between that of the-low orbits and that of the medium-period orbits, so as to limit the cost of injecting the satellite into orbit;

reduced crossing through the Van Allen belts, so as to reduce damage to the electronic circuits; and the possibility of building simpler satellites, by exploiting to the utmost the solar lighting conditions of the satellite during the whole year.

Moreover, the demand for telecommunication services reflect the wealth status of the countries, and in this regard there is a considerable difference between the Northern hemisphere of the Earth, which includes most of the industrialized countries, and the Southern hemisphere which includes under-developed and developing countries. It is therefore economically remunerative to conceive telecommunication satellite systems aimed at optimizing, in a selective manner, the supply of telecommunication services over the Northern hemisphere and over the Southern hemisphere of the Earth.

The invention described herein has a three-fold purpose, in that it is aimed at providing:

1. definition of a family of orbits particularly convenient for the implementation of telecommunication and remote sensing systems;

2. definition of multisatellite constellations based on the particular features of this family of orbits, and of one orbit in particular; and 3. definition of the general characteristics of a satellite capable of exploiting, in an economically convenient manner, the peculiar characteristics of these orbits in the implementation of the satellite systems.

The invention is also aimed at optimizing the cost-effectiveness ratio of the satellite systems for the supply of various telecommunication and remote sensing services to countries situated:

in the range of latitudes going from approximately 20° to 70° North, which contains industrialized countries and therefore the most interesting countries as regards the current demand for services and their profitability; and in the range of latitudes going from 20° to 70° South, and in the tropical band included between approximately 20° North and 20° South, where developing countries or recently industrialized countries are situated, which are interesting as regards the expected rate of growth in the demand for telecommunication and remote sensing services.

According to the invention described here, the objective is achieved by injecting the satellites into other orbits than those used normally, or those known from technical literature, and illustrated above.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

The invention will now be described with reference to typical examples and to the drawings, where:

i=orbital inclination with respect to the equatorial plane;

α=ascending node of the orbit;

β=descending node of the orbit;

A=orbit apogee;

P=orbit perigee.

Figure 1:
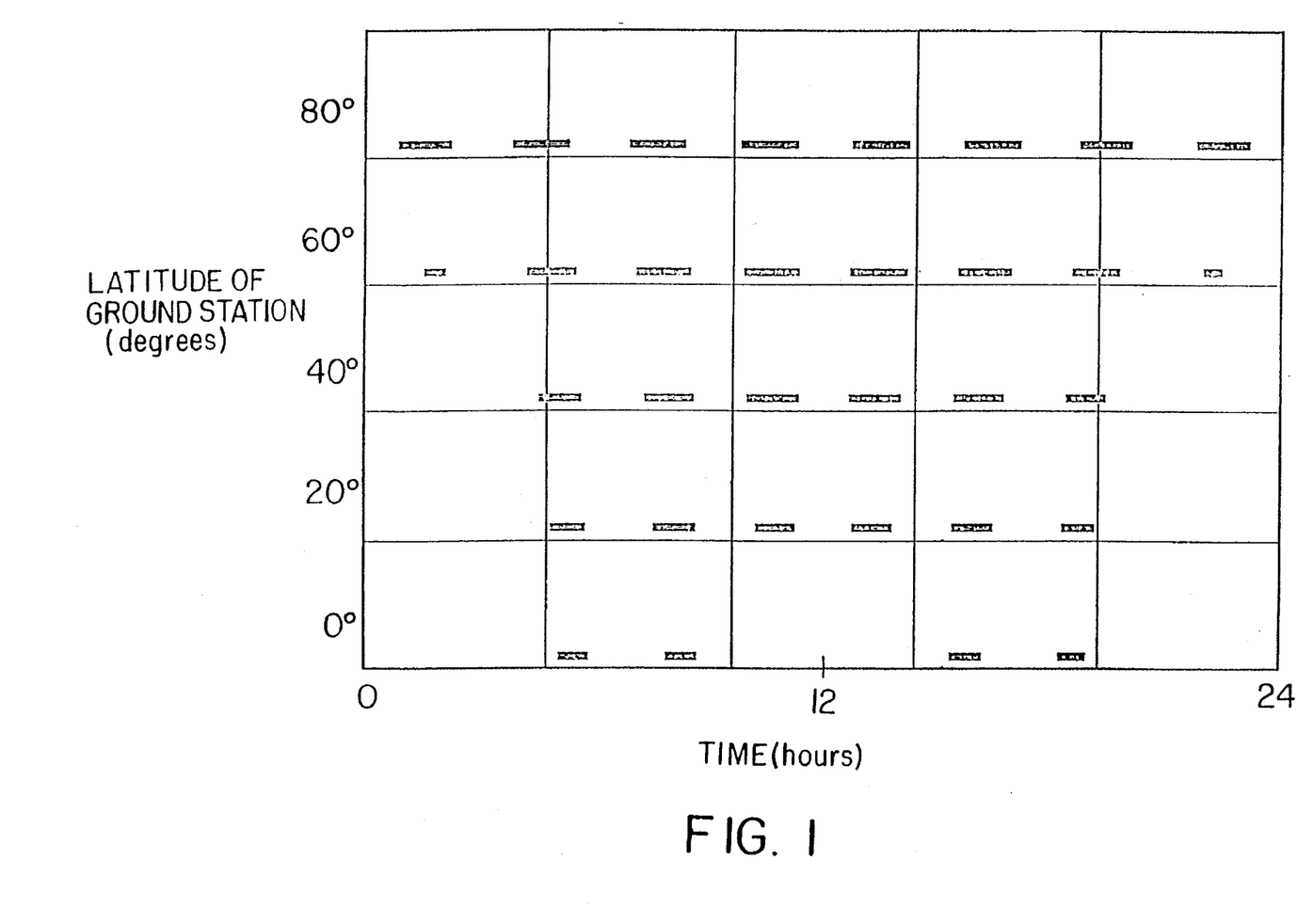
FIG. 1 is a visibility diagram of a satellite having a sun-synchronous elliptical orbit.

FIG. 1 shows the visibility diagram, in a 24-hour period, of a satellite travelling along a sun-synchronous elliptical orbit inclined by 116.6°, with a 3-hour period, an argument of perigee of 270° and a right ascension of ascending node at 18:00 hours, from five ground stations located at North latitudes of 0°, 20°, 40°, 60° and 80°, respectively.

Figure 2:
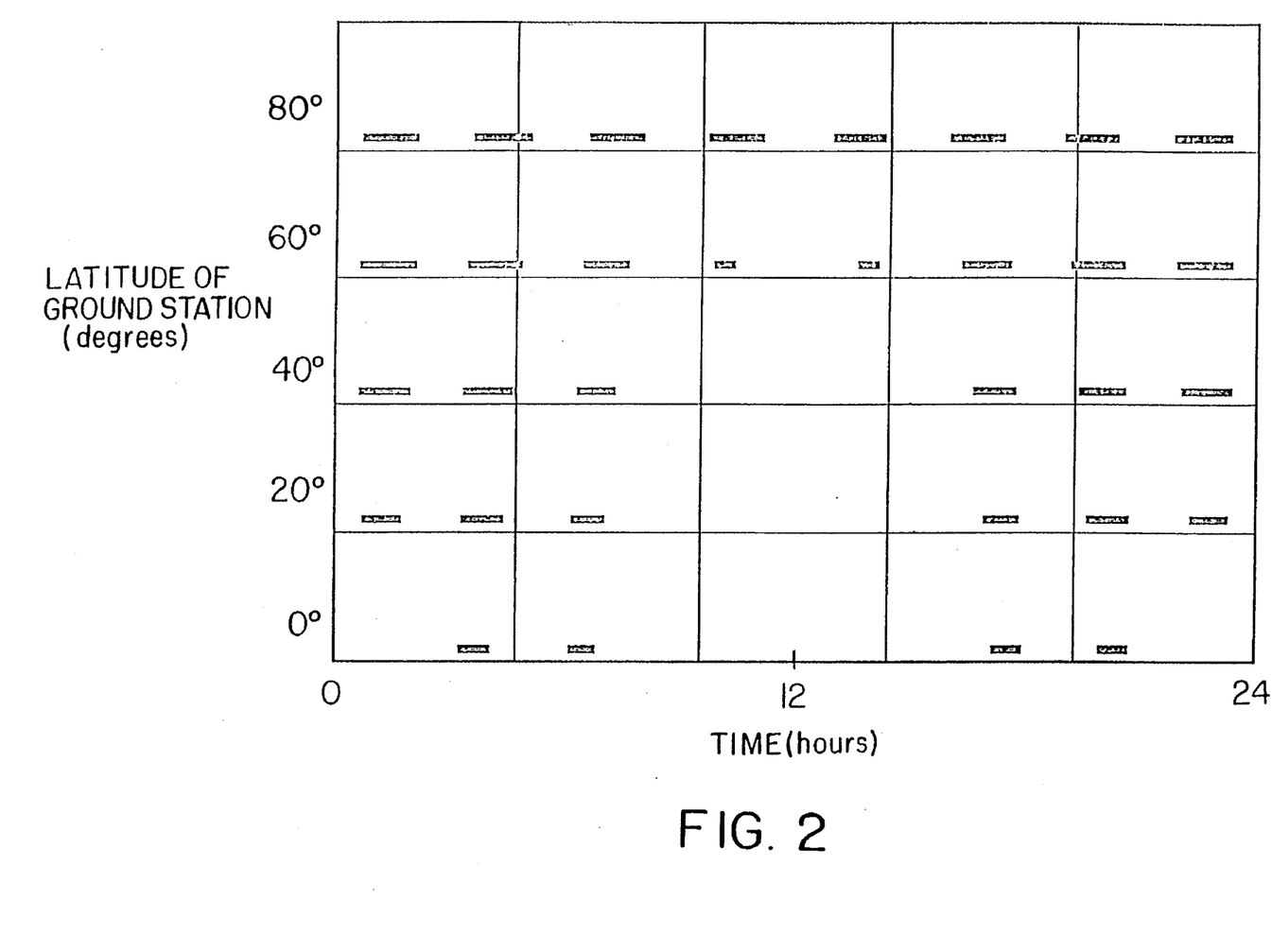
FIG. 2 is a diagram as in FIG. 1 of a satellite having a right ascension of ascending node at a different time.

FIG. 2 shows the visibility diagram, in a 24-hour period, of a satellite travelling along the same sun-synchronous elliptical orbit as that indicated in FIG. 1, but having a right ascension of ascending node at 06:00 hours, from the same five ground stations as those of FIG. 1.

Figure 3:
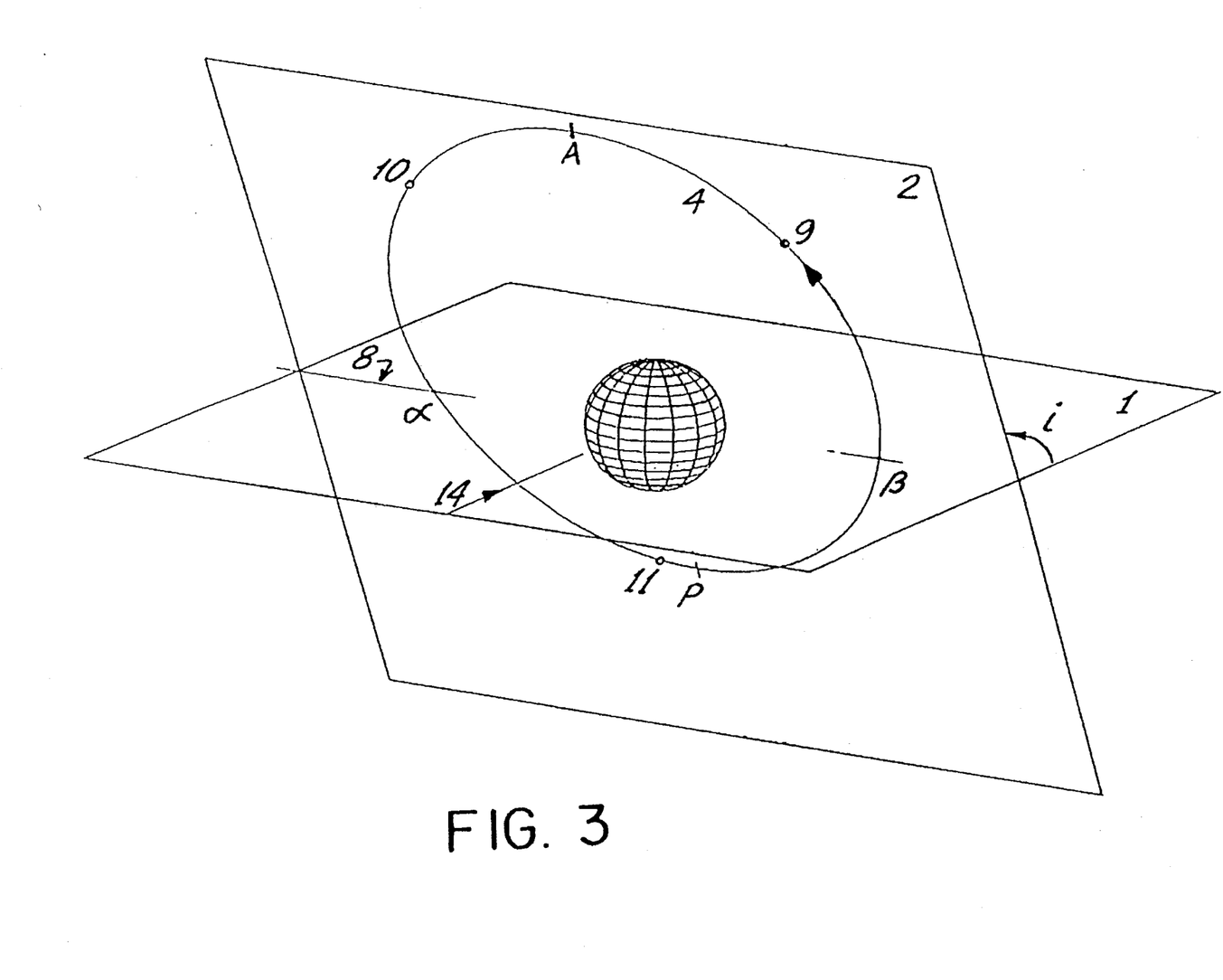
FIG. 3 schematically illustrates a constellation of the satellites pursuant to the present invention.

FIG. 3 shows an example of a constellation of three satellites injected into one elliptical sun-synchronous orbit with a 3-hour period.

In FIG. 3, 1 is the equatorial plane; 8 is the α–β line of nodes perpendicular to the direction of solar rays 14; 2 is the orbital plane inclined by 116.4° with respect to the equatorial plane; 4 is the sun-synchronous elliptical orbit with perigee P and apogee A; the three satellites 9, 10, 11, angularly equidistant in terms of mean anomaly, travel along orbit 4 in the direction indicated by the arrow.

Figure 4:
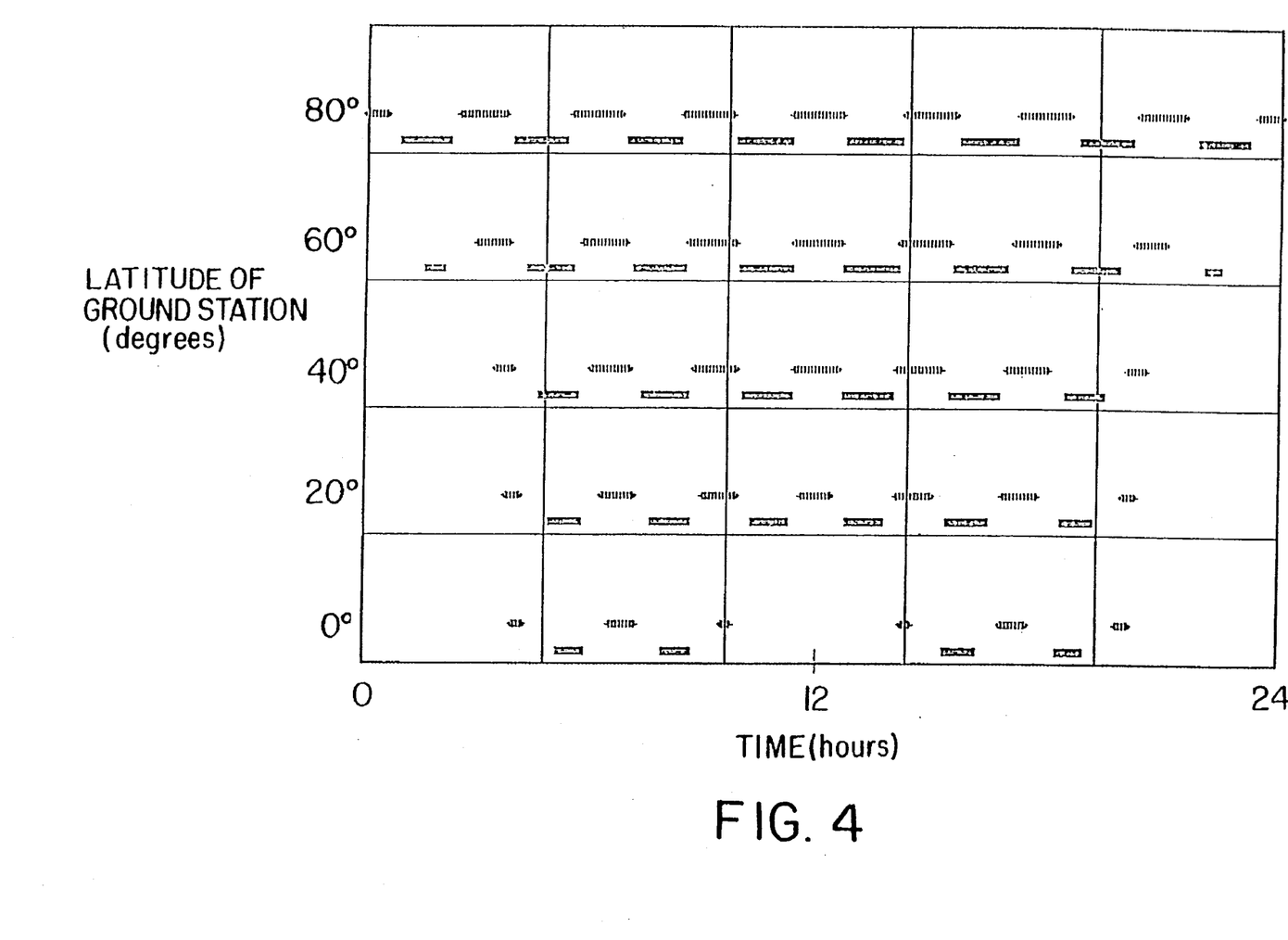
FIG. 4 is a diagram as in FIG. 1 of two satellites on the same orbit with a 3-hour period.

FIG. 4 is the visibility diagram of two satellites, angularly equidistant in terms of mean anomaly, placed on the same elliptical sun-synchronous orbit with a 3-hour period, as seen from the same five ground stations of FIG. 1.

Figure 5:
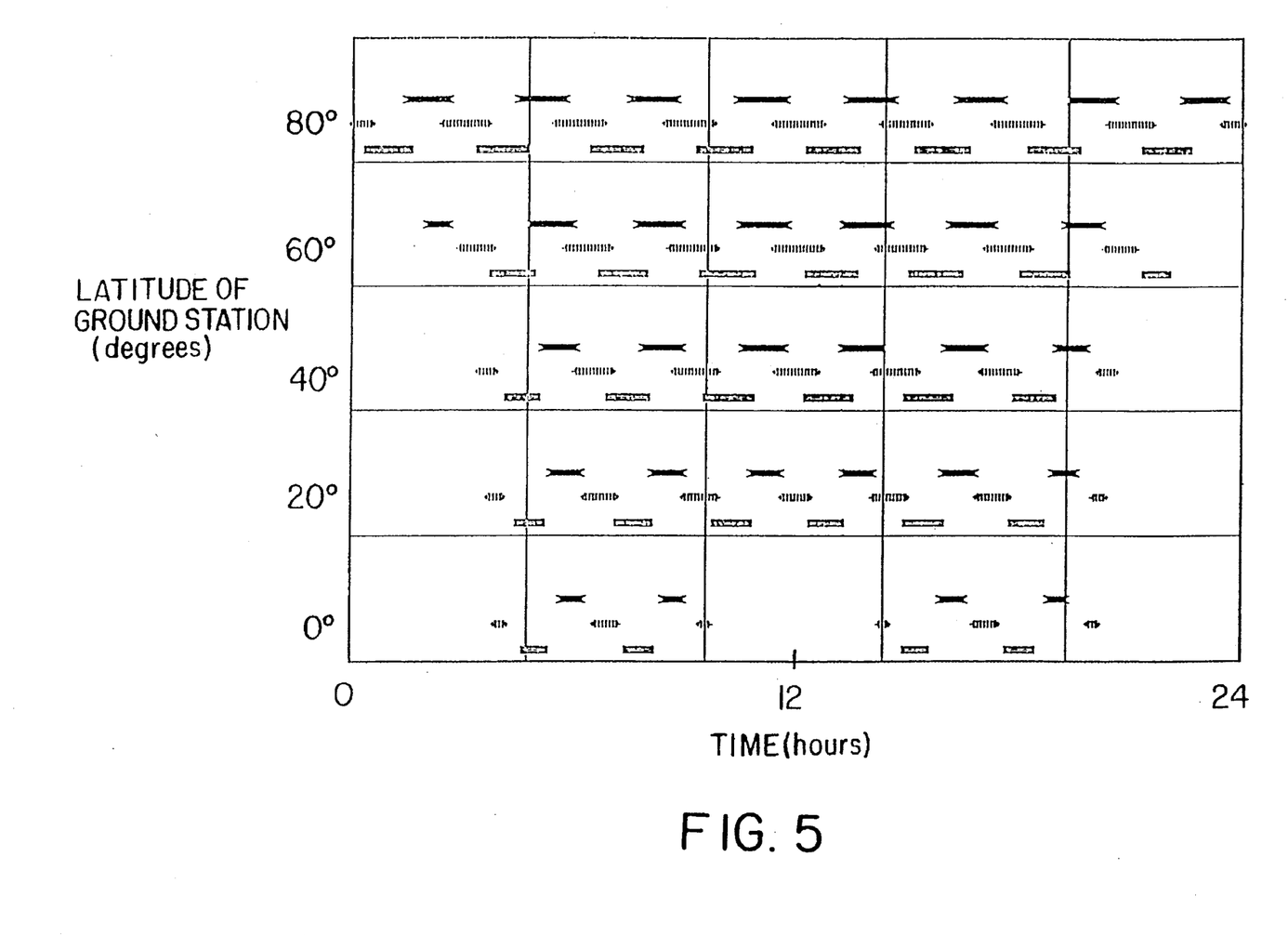
FIG. 5 is a diagram similar to FIG. 4 of three satellites on the same orbit.

FIG. 5 is the visibility diagram of three satellites, angularly equidistant in terms of mean anomaly, placed on the same elliptical sun-synchronous orbit with a 3-hour period, as seen from the same five ground stations of FIG. 1.

Figure 6:
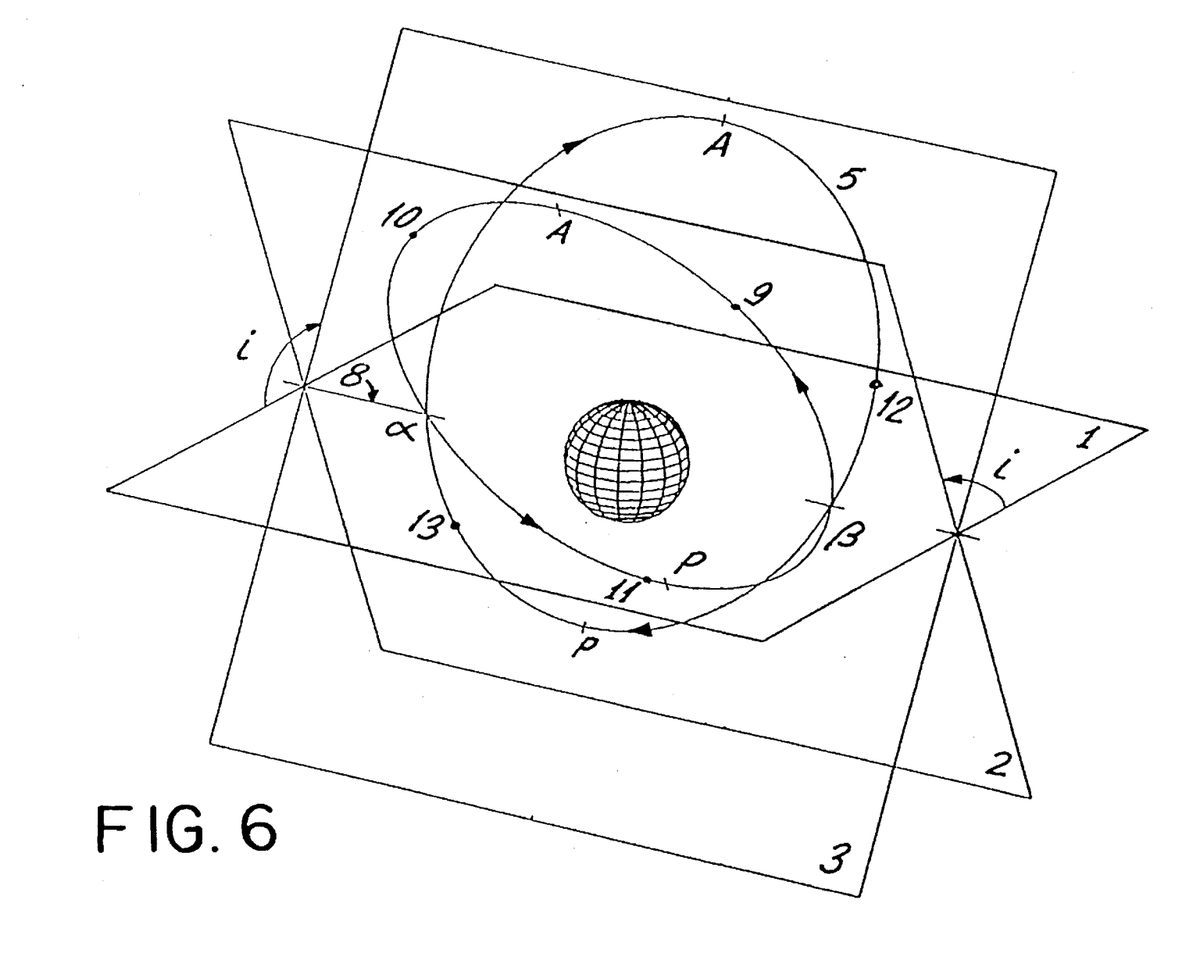
FIG. 6 schematically illustrates a constellation of five satellites.

FIG. 6 shows an example of a constellation with 5 satellites on two orbital planes 2 and 3 distributed as follows: three satellites—9, 10 and 11—angularly equidistant in terms of mean anomaly, on an elliptical sun-synchronous orbit 4 having its right ascension of ascending node at 18:00 hours; and two satellites—12 and 13—angularly equidistant in terms of mean anomaly, on an elliptical sun-synchronous orbit 5 having its right ascension of ascending node at 06:00 hours. The satellites travel along the orbits in the direction indicated by the arrows.

Figure 7:
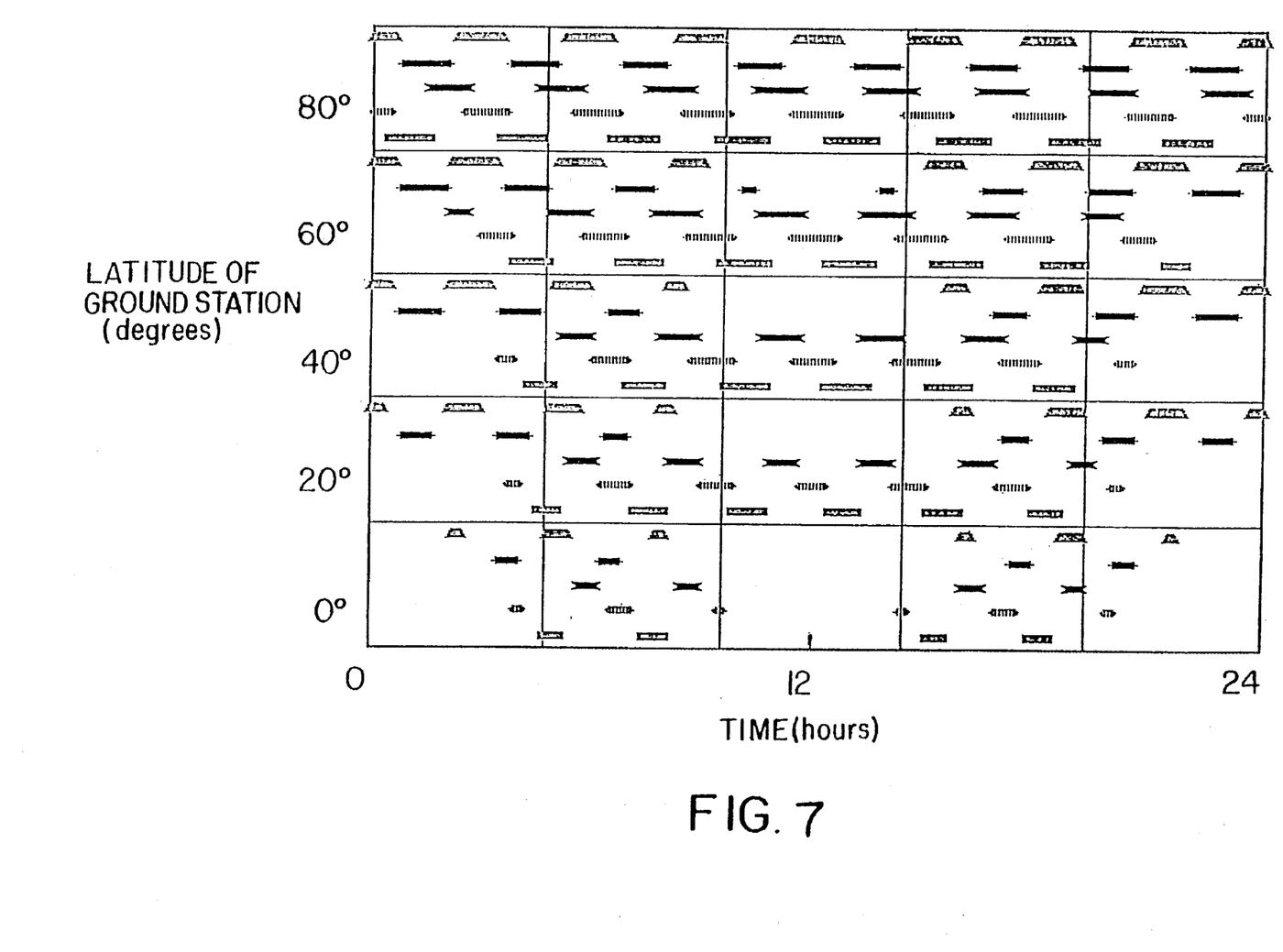
FIG. 7 is a visibility diagram of the constellation of FIG. 6.

FIG. 7 is the visibility diagram of the five satellites shown in FIG. 6, as seen from the same five ground stations as those of FIG. 1.

Figure 8:
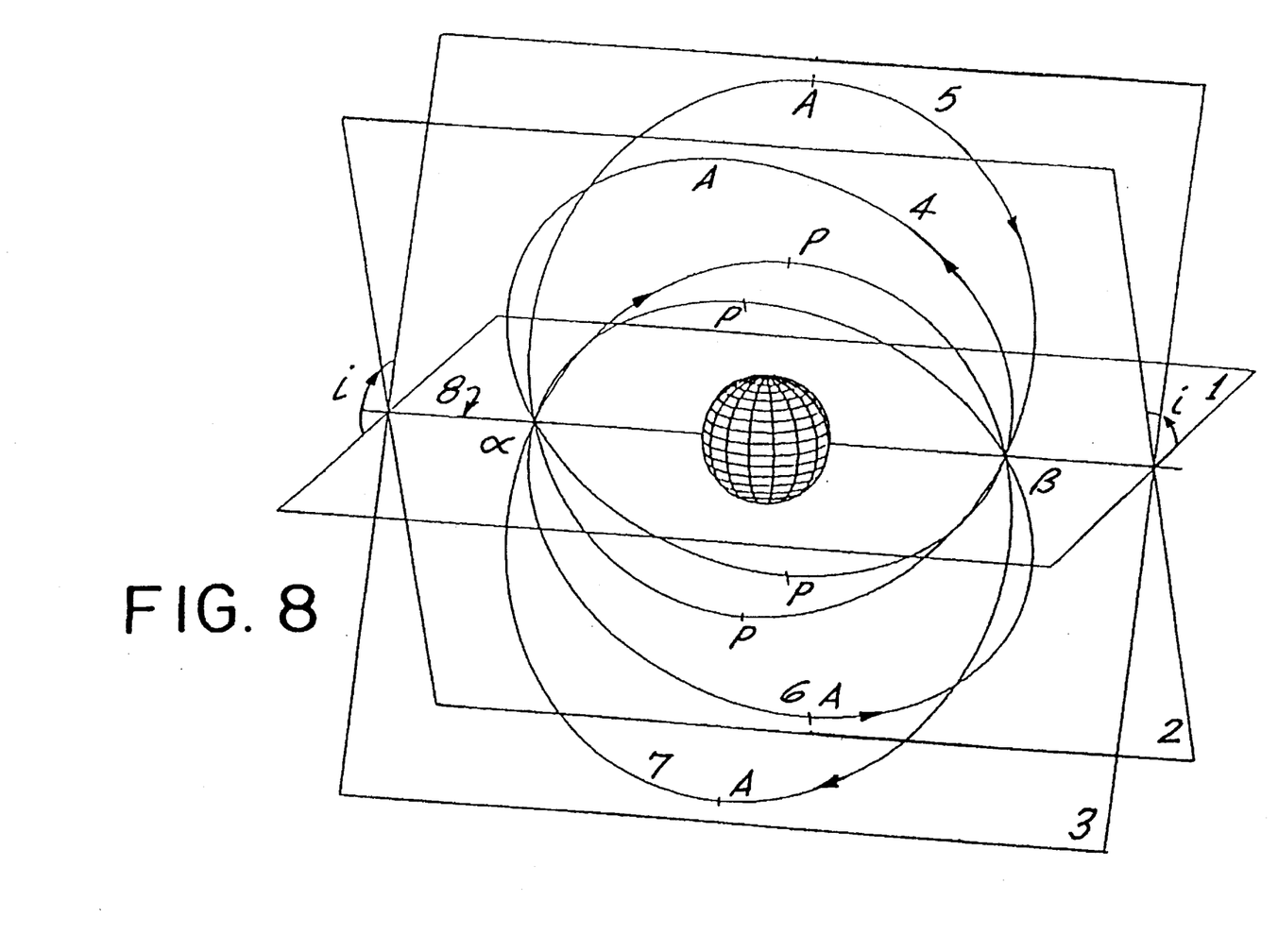
FIG. 8 schematically illustrates four satellites on two orbital planes.

FIG. 8 shows a possible configuration of four elliptical sun-synchronous orbits on two orbital planes. Two sun-synchronous elliptical orbits—4 and 5—have an argument of perigee of 270° and a right ascension of the ascending node located at 06:00 and 18:00 hours, respectively. The other two sun-synchronous elliptical orbits—6 and 7—have an argument of perigee of 90° and a right ascension of the ascending node located at 06:00 and 18:00 hours, respectively.

The aim of considerably increasing the visibility time of each satellite from a ground station, with respect to the case of low circular or slightly elliptical orbit satellites, is achieved by choosing an inclined elliptical orbit with a short period, ranging around three hours, with the apogee in the high or low latitudes, so as to cover the Northern or the Southern hemisphere of the Earth, respectively.

The eccentricity of the orbit is such as to induce a considerable difference between the altitude of the perigee and that of the apogee. The increase of the latter plays a fundamental role in increasing the satellite visibility window from the ground stations and, vice-versa, in increasing the observability time of the same geographical area as seen from the satellite.

The zero value for the precession of the line of apsides, typical of elliptical orbits, can be obtained by selecting a 63.4° inclination (solution adopted in Tundra and Molniya type orbits) or a 116.6° inclination. The invention described here is based on the 116.6° inclination, which leads to a positive rotation of the nodal line.

By imposing a daily rotation of the line of nodes equivalent to 360°/365 days=0.9863°/day, the inclined elliptical orbit turns out to be also sun-synchronous, which allows exploitation of such important practical advantages, as will be described further on.

By imposing a further constraint on the orbital period, such that N orbital periods should exactly fit into M solar days, one determines a very restricted family of orbits: in fact, the constraints imposed are met only by very few orbits, the first and the most important of which are characterized by the following values of M and N: M=1, N=8; M=2, N=17; M=3, N=25 or 26.

TABLE 1

Keplerian parameters of the elliptical sun-synchronous orbit with short period and M = 1, N = 8.

| | |
|---|---|
| Orbit inclination: | 116.6° |
| Orbital period: | 10,800 sec (⅛ of solar day) |
| Semi-major axis: | 10,560.3 Km |
| Eccentricity: | 0.347 |
| Apogee altitude: | 7,846.2 Km |
| Perigee altitude: | 518.1 Km |
| Orbit properties: | (a) sun-synchronous |
| | (b) period submultiple of solar day |
| Right asc. of asc. node: | 18:00 hours or 06:00 hours at the equator |
| Argument of perigee: | 270° to cover the Northern hemisphere; |
| | 90° to cover the Southern hemisphere |

However, the orbits featuring values of M>1 have eccentricities progressively lower than the first orbit (M=1, N=8), which is therefore to be preferred for many telecommunication applications. The Keplerian parameters of this preferred orbit are shown in Table 1, and in practice are to be corrected by taking into account the harmonic components of the Earth's gravitational field, as well as the long-period components of the luni-solar gravitational forces.

The orbits of this family are all characterized by a considerably lower energy than that of the medium-period circular orbits and of the highly eccentric orbits inclined with a period of 8, 12 or 24 hours. This implies a significant reduction in the value of the velocity change to be imparted to the satellite for a coplanar orbit transfer from a low circular orbit, where the satellite is usually placed by the launcher, to the target orbit, as shown in Table 2. Consequently, there is a significant reduction in the propellant weight to be transported aboard the satellite, and therefore smaller overall weight and lower launching costs.

TABLE 2

Velocity change required for a coplanar orbit transfer from a circular orbit (500 Km altitude) to the target orbit.

| Orbit | Eccentr. | Period | Velocity change |
|---|---|---|---|
| Tundra | 0.4 | 24 hours | 3442 m/sec |
| Molniya | 0.7 | 12 hours | 2570 m/sec |
| 8-hr elliptical | 0.28 | 8 hours | 2787 m/sec |
| 8-hr circular | 0 | 8 hours | 3009 m/sec |
| ellipt. sun-synchr. | 0.347 | 3 hours | 1259 m/sec |
| low circular | 0 | <2 hours | 511 m/sec |

(1,400 Km altitide)

The eccentricity value of the preferred orbit, according to the invention, implies that the perigee must be rather high (approximately 500 Km) and such as to reduce the problems linked to aerodynamic drag due to the presence of the atmosphere. At these altitudes, air density is sufficiently low and only marginally affects the satellite life time.

The apogee altitude (approximately 7,850 Km) guarantees at least 6 visibility windows from the ground stations located in the range of latitudes of interest, namely from 20° to 80° North or South with respect to the equator; the duration of such windows ranges from 40 to 80 minutes, and is therefore approximately 1 hour long on average, instead of the 10 minutes typically obtained using satellites in low circular or slightly elliptical orbits.

This corresponds to a 25% daily average coefficient of use per site and per satellite. These particularly favorable characteristics make it possible to set up connections for innovative services such as teleconferences, videoconferences and the radio broadcasting of radio or TV programs, over-coming the obstacle caused by the short uninterrupted duration of the connections which limits the use of low-orbit satellites to telephony services.

However, the altitude of apogee is low enough to avoid crossing through the second Van Allen belt, which begins at an altitude of approximately 8,500 Km and reaches a maximum at 16,000 Km. In comparison, the Molniya orbit and other orbits derived from it continuously cross through this belt of dangerous radiation, with negative consequences to the satellite components in terms of life and reliability.

The choice of the argument of perigee for the elliptical orbit with a 3-hour period makes it possible to optimize the coverage of the Earth's two hemispheres. In particular, by selecting a value for the argument of perigee close to 90°, the apogee of the orbit is in the Southern hemisphere. If the argument of perigee is close to 270°, the apogee is in the Northern hemisphere. It is also possible to select other arguments of perigee, so as to optimize the coverage of specific bands of latitude.

As regards the position of the orbital plane, which depends on the right ascension of ascending node, it can be any position. However, the particular choice of orbit position in a plane which is almost always orthogonal with respect to the solar vector (the so-called "sunrise-sunset" orbit, since it follows approximately the terminator line), by virtue of its being sun-synchronous, allows considerable simplifications in satellite design and manufacturing. First of all, the satellite will always be illuminated by the Sun on all days of the year, except during very short time intervals. However, the part of the orbit which is in the shadow cone of the Earth is always close to the perigee, namely when the satellite need not generate power for the payload.

The fact that the incidence of the solar vector on the satellite is constant also allows simplification of the power generator (solar panels and batteries), thus reducing the weight and cost of the satellite. Moreover, the satellite is in stationary thermal environmental conditions along the orbit and during the year, which makes it possible to design very simple thermal control systems.

The right ascension of ascending node, in the "sunrise-sunset" orbit, also determines whether the satellite will be visible from Earth essentially by day or by night. This is a very important factor both for telecommunication and for remote sensing systems, keeping in mind the time dependence of the communication flows generated from human work and free-time activities, and the dependence of the observability of the Earth's surface features in the optical bands in the daylight hours. In particular, if the argument of perigee is 270°, so that the apogees of the orbits are located in the Northern hemisphere, the value of the right ascension of ascending node must be located at 18:00 hours, if one desires the satellite to be visible from Earth essentially by day. This is shown in FIG. 1, which illustrates the trend of the visibility of a satellite placed on the preferred orbit according to the invention described here, with an argument of perigee of 270° and a right ascension at 18:00 hours, as seen from five ground stations located at 0°, 20°, 40°, 60° and 80° latitudes. FIG. 1 shows that the satellite is visible, on average, during six time intervals lasting from 40 to 80 minutes, around a value of 12:00 hours. Moreover, the satellite visibility increases at high latitudes and decreases at low latitudes, i.e., close to the equator.

Vice-versa, if the right ascension of ascending node is around 06:00 hours, the satellite will essentially be visible during the evening and night hours. This is shown in FIG. 2, which illustrates the trend of the visibility of the satellite on an orbit with an argument of perigee of 270° and a right ascension at 06:00 hours, as seen from the five ground stations of FIG. 1. In this case, the satellite is visible for the same time intervals of FIG. 1, but at about 24:00 hours local time.

If the argument of perigee is equivalent to 90°, the situation is inverted, i.e.: a right ascension at 18:00 hours will make the satellite visible during the evening and night hours, while a right ascension value at 06:00 hours will make it visible during the daylight hours.

These features allow to:

design systems with multiple satellites travelling along one or more orbital planes, optimized so as to satisfy the demand for telecommunication services essentially during daylight hours, or only during night-time, or around the clock, both at regional and multiregional levels, and finally at global level; and design multisatellite systems, on one or more orbital planes, capable of carrying out Earth observation missions on limited areas, at regional and multiregional levels, in the optical bands (UV, visible and near-IR) essentially during daylight hours, and in the thermal IR band mainly during night-time.

Only by way of example, several satellite constellations are described below, which are based on elliptical sun-synchronous short-period orbits, according to the present invention.

Example No. 1: Constellation of satellites on a single orbital plane.

In a preferred form of the invention, the constellation consists of 2, 3 or 4 satellites having the characteristics described in Table 1, with an argument of perigee of 270°, so as to optimize the coverage of countries situated North of the equator and with right ascension of ascending node at 18:00 hours at the equator. All satellites are placed along the same orbit and are equidistant by 180°, 120° or 90°, respectively, in terms of mean anomaly.

FIG. 3 shows an application of the system to the particular case of three co-orbitant satellites. The number of satellites placed along the same orbit depends on the minimum value of the angle of elevation, with respect to the horizon, at which one wishes to establish radio links between ground terminals and the satellite, and on the degree of overlapping required between the visibility intervals of two contiguous satellites. This is shown in FIGS. 4 and 5, relating to a constellation of 2 and 3 satellites on the same orbit. FIG. 4 shows that the presence of two satellites along the same orbit is just enough to guarantee continuity of visibility of at least one satellite during a time interval of approximately 16 hours at about 12:00 hours local time. However, this is possible when the minimum angle of elevation with respect to the horizon is at least 10°. FIG. 5 shows the improvement which can be obtained by using three co-orbitant satellites: in addition to a better continuity, one also obtains a significant overlapping of the visibility intervals of two satellites at a time, as seen from the ground stations. This last feature can be exploited for telecommunication systems, or in order to increase the minimum angle of elevation with respect to the horizon.

In conclusion, this constellation provides good coverage of the range of latitudes above 20° North for a period of approximately 16 hours a day centered around 12:00 hours local time, namely from 04:00 hours in the morning to 20:00 hours. It is possible, however, to make other choices for the right ascension of ascending node so as to anticipate or delay the interval of satellite visibility. For example, by choosing the right ascension of ascending node at 21:00 hours (instead of 18:00 hours), the visibility interval of the satellites will range from 07:00 hours to 23:00 hours local time.

A similar constellation, with an argument of perigee of 270° and a right ascension of the ascending node at 06:00 hours at the equator, makes it possible to perform communication services during the afternoon and night-time hours, namely front approximately 16:00 hours to 08:00 hours in the morning. In this case it is also possible to choose a right ascension of ascending node within a 2–3 hour time interval with respect to 06:00 hours, so as to center the period of visibility of the satellites in accordance with the telecommunication service requirements.

Similar constellations of satellites on a single orbit and with an argument of perigee of 90° makes it possible to obtain the same characteristics, with reference to geographical areas located in the Southern hemisphere of the Earth.

Example No. 2: Constellation of satellites on two orbital planes.

According to another preferred application of the invention, the constellation is distributed on two orbital planes, each one including from two to four satellites angularly equidistant in terms of mean anomaly. The parameters of the two orbits are the same as those of the previous example, but one of the two orbits has the right ascension of ascending node located at 18:00 hours±3 hours. The other orbit has the right ascension of ascending node located at 06:00 hours±3 hours.

FIG. 6 shows an example of an asymmetrical constellation with three satellites—9, 10, 11—on the orbit with the right ascension of the ascending node located at 18:00 hours, and two satellites—12 and 13—on the orbit with the right ascension of ascending node located at 06:00 hours.

The constellation provides a sufficient 24-hour coverage of the latitudes above 20° North. Coverage and service continuity are particularly good during a time interval longer than 16 hours around 12:00 hours, as shown in FIG. 7 which illustrates the visibility diagram of the five satellites as seen from the five ground stations of FIG. 1.

It is also possible to change the values of the right ascension of ascending node of the two orbital planes with respect to the nominal values which are herein located at 06:00 and 18:00 hours. This causes a variation in the overlapping of the time intervals during which the ground stations can simultaneously observe the satellites belonging to both orbits. In this rammer, even if for short time intervals, one can take advantage of a greater transmission capability with respect to the average value obtainable in 24 hours. This fact can be exploited by satellite telecommunication systems so as to solve problems due to fluctuations or peaks of traffic, which occur as a consequence of a higher amount of human work activity during working hours, or of free-time activity in the evening.

Example No. 3: Constellation of satellites on 4 orbital planes for the coverage of ranges of latitudes North and South of the equator.

According to another application of the invention, shown in FIG. 8, the constellation of satellites is distributed on four orbital planes. Orbits 4 and 5 are used for the coverage of the range of latitudes above 20° North; orbits 6 and 7 are used to cover the range of latitudes below 20° South. The orbital parameters and the number of satellites for each orbit are the same as those indicated in Example 2, except that the orbits for the coverage of the Southern hemisphere have an argument of perigee of 90°. The orbits used for the coverage of the Northern or Southern hemisphere can have values of the right ascension of ascending node which differ from the nominal ones, corresponding to 06:00 and 18:00 hours local time, so as to better satisfy the specific requirements related to satellite telecommunication or remote sensing services.

The use of short period elliptical sun-synchronous orbits for the implementation of multisatellite constellations offers important advantages in the design of national, regional and global telecommunication systems and of Earth observation systems in the optical bands, in the design of the satellites, and in the launching and management in orbit of such satellites.

The number of satellites necessary in order to obtain satisfactory coverage of the Northern or Southern hemisphere of the Earth is considerably low: five or six satellites are sufficient for continuous 24-hour service. Only three satellites are necessary in order to carry out telecommunication or remote sensing services to be performed preferably only during daylight or night-time hours. The altitude of apogee gives long periods of uninterrupted visibility for each satellite, thus reducing the problems deriving from frequent handovers, namely traffic transfers from one satellite to the next on exit of the former from the visibility cone of each ground station.

The reduction in the number of different orbital planes, on which the satellites belonging to the constellations are placed, makes it possible to reduce launching costs and to simplify the operations for orbit make-up and orbit management for the satellites. As regards the simplification gained in the design of satellites, it is particularly important to consider the power system (power generation and storage) and the thermal control system.

Only by way of example, one may consider a general configuration of one satellite which uses in an optimal manner the orbit features of short period, ellipticity and sun-synchronism. During the year, the angle between the solar vector and the perpendicular to the orbit plane changes very slowly, the variation depending on the value of the right ascension of ascending node. If the latter is located at 06:00 or 18:00 hours, the angle ranges from 90° (i.e., exactly orthogonal to the orbit plane) to approximately 45°. If the right ascension of ascending node is anticipated or delayed by two hours with respect to the nominal values mentioned above, the angle between the solar vector and the normal to the orbital plane ranges from 65° to approximately 30°. In any case, the variation of the angle of incidence of the solar vector on the satellite is very slow and is practically zero during the interval of one day. It is therefore possible to keep the solar panels fixed in place, giving them an initial attitude such as to minimize the average shifting expected, during the year, of the solar vector from the normal to the solar panel. This generates a very small loss in efficiency, which is offset by the reduced complexity of the solar plant, characterized by the absence of mechanisms for orienting the one-or two-degree-of-freedom solar panels, which mechanisms are typically used in other satellites.

If one wishes to optimize the efficiency of the solar plant during the entire year, it is sufficient to set up simple mechanisms for solar panel re-orientation. Unlike other satellites, not placed along such an elliptical sun-synchronous orbit as that described here, these mechanisms require non-frequent and very slow actuations, thus causing very little disturbance to the satellite attitude control.

Moreover, since the satellite is almost always illuminated by the sun (unlike satellites placed on inclined nonsunsynchrous circular or slightly eccentric orbits, which spend approximately half of the orbital period in the Earth shadow cone), it results in a reduced need for power to be stored into the batteries aboard the satellite. This means that the battery weight can be significantly reduced, with positive effects on the overall weight and therefore on the costs of the satellite.

From the thermal control viewpoint, the satellite always sees a heatsink, represented by the black sky at a temperature of 4K, on the side opposite to that where the solar plant is placed. It will therefore suffice to equip the satellite with radiating panels on the side of the satellite which faces the black sky. The almost constant solar illumination makes it possible to simplify the thermal design, with consequent savings in weight and cost.

The invention is not limited by the embodiments described above which are presented as examples only but can be modified in various ways within the scope of protection defined by the appended patent claims.

I claim:

1. A satellite telecommunications and remote sensing system comprising a plurality of satellites arranged above Earth in at least one short-period elliptical sun-synchronous orbit having the following Keplerian parameters:

an orbit inclination of 116.6° on an equatorial plane of the Earth;

a daily rotation of a nodal line of 0.9863°; and an orbital period such that N orbital periods fit into M sidereal days.

2. A satellite systems as defined in claim 1, wherein M and N have one of the following sets of values: M=1, N=8; M=2, N=17; M=3, N=25; and M=3, N=26.

3. A satellite system as defined in claim 1, wherein said orbit has the following Keplerian parameters: M=1, N=8; an orbital period of 10,800 seconds; an orbit eccentricity of 0.347; an apogee altitude of approximately 7,846.2 Km; a perigee altitude of approximately 518.1 Km; an argument of perigee of 270° to cover a Northern hemisphere of the Earth; and a right ascension of the ascending node located at one of 18:00 hours±3 hours local Earth time (at the equator) for connection of terrestrial sites and users during daylight hours, and 06:00 hours±3 hours (at the equator) for connection of terrestrial sites and users during afternoon and nighttime hours.

4. A satellite system as defined in claim 1, wherein said orbit has the following Keplerian parameters: M=1, N=8; an orbital period of 10,800 seconds; an orbital eccentricity of 0.347; an apogee altitude of approximately 7,846.2 Km; a perigee altitude of approximately 518.1 Km; an argument of perigee of 90° to cover a Southern hemisphere of the Earth; and a right ascension of the ascending node located at 06:00 hours ±3 hours (at the equator) for connection of terrestrial sites and users during daylight hours, and located at 18:00 hours±3 hours (at the equator) for connection of terrestrial sites and users during afternoon and nighttime hours.

5. A satellite system as defined in claim 1, wherein two-four co-orbitant satellites and arranged on orbits whose value of right ascension of ascending node is selected one of around 06:00 hours and around 18:00 hours, local Earth time.

6. A satellite system as defined in claim 1, wherein said plurality of satellites include satellites arranged in at least two orbits having different values of right ascension of ascending node, said values being, respectively, around 06:00 hours and around 18:00 hours.

7. A satellite system as defined in claim 4, wherein the orbits have different values of the argument of perigee.

8. A satellite system as defined in claim 7, wherein the different values of the argument of perigee of the orbits are around 270° and around 90°.

9. A satellite system as defined in claim 1, and further comprising a plurality of ground stations for receiving satellite transmissions.

10. A satellite system as defined in claim 9, wherein said ground stations are located at North latitudes of 0°, 20°, 40°, 60° and 80°.

11. A satellite system as defined in claim 5, wherein 3 co-orbitant satellites are arranged with a 3-hour period.

12. A method of providing satellite telecommunication, comprising the steps of arranging a plurality of satellites above the Earth in short-period elliptical sun-synchronous orbits having Keplerjan parameters as follows:

an orbit inclination of 116.6° on an equatorial plane of the Earth;

a daily rotation of a nodal line of 0.9863°; and an orbital period selected such that N orbital periods fit into M sidereal days; any desired argument of perigee; and any desired right ascension of the ascending node.

13. A method as defined in claim 12, further comprising providing a plurality of receiving stations arranged on the Earth at latitudes for desired communication.

14. A method as defined in claim 12, including arranging two-four co-orbitant satellites on orbits which have differing values of right ascension of ascending node.

* * * * *